United States Patent [19]

May et al.

[11] 4,047,542
[45] Sept. 13, 1977

[54] BYPASS VALVE

[75] Inventors: Czeslaw J. May; Donald A. Piepho, both of Aurora, Ill.

[73] Assignee: Caterpillar Tractor Co., Peoria, Ill.

[21] Appl. No.: 655,336

[22] Filed: Feb. 5, 1976

[51] Int. Cl.² .............................................. F16K 11/16
[52] U.S. Cl. ............................. 137/627.5; 137/596.12
[58] Field of Search ...................... 137/596.12, 596.13, 137/627.5, 628

[56] References Cited

U.S. PATENT DOCUMENTS

| 2,607,599 | 8/1952 | Kanuch | 137/596.12 |
| 3,339,586 | 9/1967 | Tenkku | 137/596.12 X |
| 3,605,809 | 9/1971 | Thorson | 137/596.12 X |

Primary Examiner—Robert G. Nilson
Attorney, Agent, or Firm—Phillips, Moore, Weissenberger, Lempio & Majestic

[57] ABSTRACT

A valve includes a pair of valving spools reciprocally disposed within a bore, with one valving spool movable to cut off application of fluid pressure from a pump to a steering yoke piston, and the other valving spool being movable to a position to relieve fluid pressure provided by the pump.

3 Claims, 2 Drawing Figures

BYPASS VALVE

BACKGROUND OF THE INVENTION

This invention relates to valve means, and more particularly to a valve which includes first and second valving spools for providing a bypass of fluid pressure therethrough.

In general, it is well-known to provide a steering valve for applying fluid pressure from a pump to a steering booster valve to in turn actuate a steering clutch yoke. Such a steering valve of this type is designed so that the pump continues to be loaded even though such pressure is not needed to actuate the steering system of the vehicle. It would by highly desirable to provide means which allow unloading of the pump when fluid pressure need not be supplied thereby to the steering system, in order to lower the load on the engine of the vehicle.

U.S. Pat. No. 3,605,809 to Thorson discloses a hydraulic valve wherein a valving spool is movable in a bore to one position wherein a pump provides fluid pressure to a motor, and to another position wherein the pump is unloaded. However, it will be noted that the structure necessary for achieving such results is relatively complex, involving a single spool defining a plurality of lands and grooves thereon.

SUMMARY OF THE INVENTION

It is accordingly an object of this invention to provide a valve which is capable of directing fluid pressure from a pump to a steering system for proper actuation of the steering system.

It is a further object of this invention to provide a valve which, while fulfilling the above object, provides means for unloading the pump when fluid pressure need not be supplied to the steering system.

It is a still further object of this invention to provide a valve which, while fulfilling the above objects, is extremely simple in design and operation.

Broadly stated, such valve comprises a valve body having inlet port means comprising first and second inlet ports for communication with first and second branch conduits communicating with a source of fluid pressure, an outlet port adapted to communicate with tank, and a work port, each port communicating with a bore defined by the valve body. First and second valving spools are reciprocally positioned within the bore, the first valving spool being movable to a first position to provide communication between the first inlet port and the outlet port and movable to a second position to block communication between the first inlet port and the outlet port. The second valving spool is movable to a first position blocking fluid communication between the second inlet port and working port, and movable to a second position providing fluid communication between the second inlet port and the working port. Means are operatively connected with the first and second valving spools for providing that movement of the first valving spool from its first to its second position moves the second valving spool from its first to its second position, and movement of the first valving spool from its second to its first position moves the second valving spool from its second to its first position.

BRIEF DESCRIPTION OF THE DRAWINGS

These and other objects of the invention will become apparent from a study of the following specification and the drawings, in which.

DESCRIPTION OF THE PREFERRED EMBODIMENTS

Figure 1:
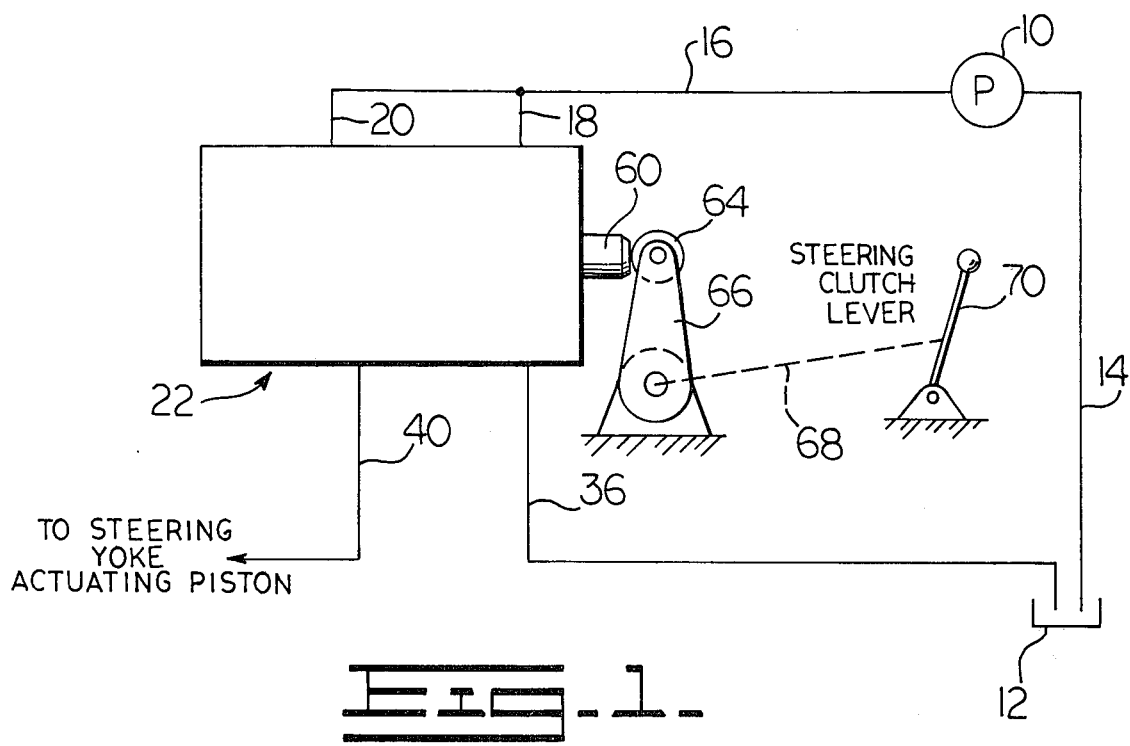
FIG. 1 is a schematic view of a system incorporating the present control valve.

As shown in FIG. 1, a fluid pump 10 draws fluid from a tank 12 through a conduit 14 and pumps such fluid through a conduit 16 and into branch conduits 18, 20 communicating with conduit 18 to a control valve 22. Thus, the pump 10 and tank 12 act as a source of fluid pressure supplied to the valve 22.

Figure 2:
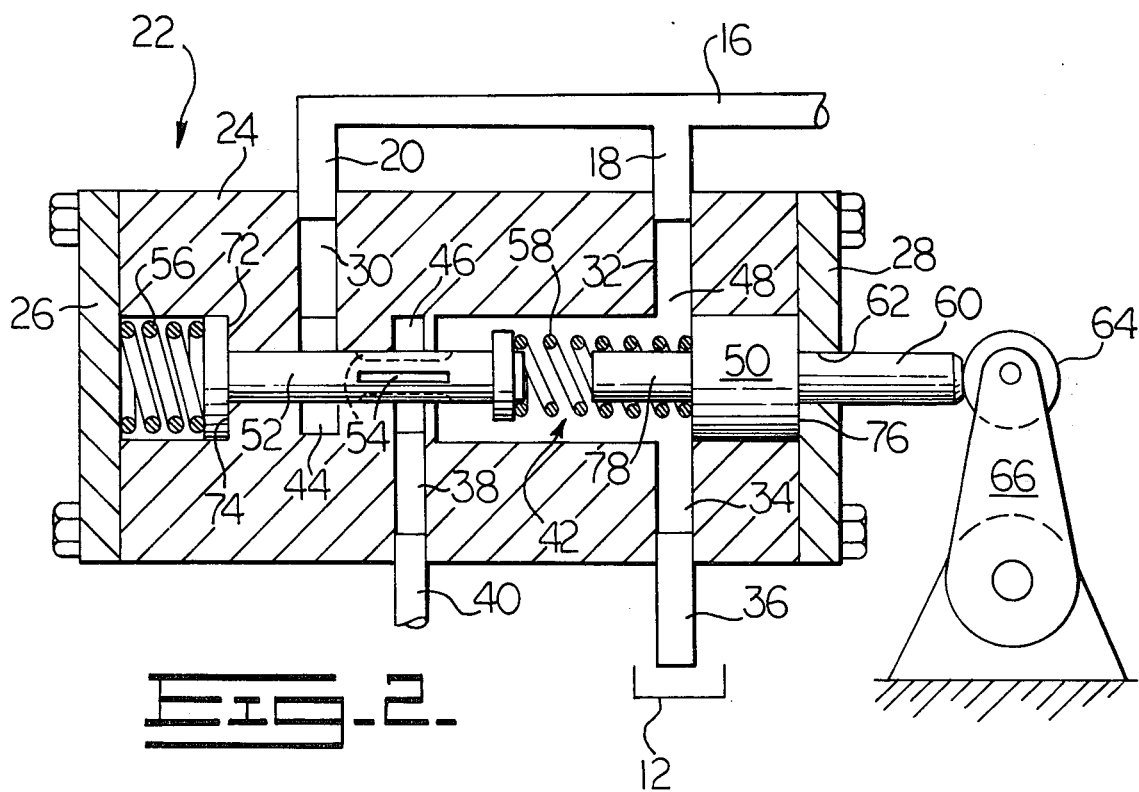
FIG. 2 is a sectional elevation of the valve of FIG. 1.

As shown in FIG. 2, the valve 22 is made up of a main valve body 24 and end plates 26, 28 fixed thereto. The valve body 24 also defines an outlet port 34 which is adapted to communicate with tank 12 through conduit 36, and a working port 38 for communication through a conduit 40 with a steering yoke actuating piston which acts as a booster for actuating a steering clutch yoke.

Each of the ports 30,32,34,38 communicate with a bore 42 defined by the valve body 24, as shown, the ports 30,32,34,38 communicating with the bore 42 through annular grooves 44,46,48 defined by the valve body 24. A valving spool 50 is reciprocally positioned in the bore 42, and it will be seen that such valving spool 50, because of the alignment of the port 32, and the port 34, is movable to the position shown in FIG. 2 wherein communication is provided between the inlet port 32 and the outlet port 34, and is movable to a position leftward in FIG. 2 to block fluid communication between the inlet port 32 and the outlet port 34. A valving spool 52 also being reciprocally positioned within the bore 42 defines a plurality of longitudinal throttling slots 54 intermediate the ends thereof. The valving spool 52 is movable to a position as shown in FIG. 2 blocking communication between the inlet port 30 and the working port 38, since the slots 54 are in the position shown therein and movable to a position leftward in FIG. 2 wherein the slots 54 provide fluid communication between the annular groove 44 and annular groove 46 and thus between the inlet port 30 and working port 38.

A helical spring 56 is disposed between the valving spool 52 and the end plate 26, to urge the valving spool 52 relatively rightwardly, and a helical spring 58 is disposed between the valving spool 50 and valving spool 52, to resiliently urge them apart. The valving spool 50 defines an extension 60 which extends through an aperture 62 in the end plate 28 to be contacted by a roller 64 mounted to a link 66 pivotally mounted relative to the vehicle. The link 66 may be provided clockwise and counter-clockwise by means of a push-pull rod 68 interconnecting the link 66 with a steering clutch lever 70, as shown in FIG. 1. The springs 56,58 are chosen so that when the steering clutch lever 70 is released, the valving spools 50,52 adopt their fully rightward positions, with a shoulder portion 72 of the valving spool 52 in contact with a corresponding shoulder portion 74 of the valve body 24, and a shoulder portion 76 of the valving spool 50 contacting the end plate 28. The valving spool 50 also defines an arm 78 extending therefrom toward the valving spool 52.

It is also to be noted that with the valving spool 52 in the position shown in FIG. 2, the slots 54 provide communication between the working port 38 and outlet port 34 through the slots 54.

In the operation of the device as thus far described, with the valving spools 50,52 in the positions shown in FIG. 1, fluid pressure is applied to branch conduits 18,20 and is released from branch conduits 18,20 through bore 42, through conduit 36 and to tank 12. Thus, there is no fluid pressure build-up in the annular groove 44, and the fluid pump 10 is not loaded. Such is the case when pressure need not be supplied to the steering yoke actuating system. Upon movement of the steering clutch lever 70, the link 66 is pivoted counterclockwise, to move the valving spool 50 leftward. The springs 56,58 are chosen so that spring 56 is much stronger than spring 58, so that upon initial leftward movement of the valving spool 50, the valving spool 52 remains in the position shown until the extending arm 78 contacts the valving spool 52. Before such contact occurs, the blocking of fluid communication between the inlet port 32 and outlet port 34 has taken place, due to such movement of the valving spool 50. Upon further leftward movement of the valving spool 50, the arm 78 contacts the valving spool 52 whereupon further pivoting of the link 66 in the counterclockwise direction moves the valving spools 50, 52 further together against the resilience of the spring 56.

Sufficient leftward movement of the valving spool 52 provides communication between the inlet port 30 and the outlet port 38 through the slots 54 communicating in turn with the annular grooves 44,46. As such slots 54 provide relatively gradual communication between the port 30 and port 38, such slots 54 provide modulating of fluid between the port 30 and port 38, supplied to the steering yoke actuating piston. During leftward movement of the valving spool 52, communication is cut off between the working port 38 and outlet port 34. Thus, pressure is now properly built up in the outlet port 38 to be supplied to the steering yoke actuating piston.

Release of the steering clutch lever 70 allows the link 66 to be pivoted clockwise under the resilience of the springs 56,58. Initially, in substantially the reverse manner set forth above, the valving spools 50,52 move together, under the resilience of the spring 56 until the valving spool 52 blocks communication between the inlet port 30 and working port 38, the slots 54 having been moved rightwardly to no longer provide communication between such ports 30,38. The slots 54 provide communication between the working port 38 and tank 12 to release fluid pressure applied to the steering yoke actuating piston. However, in such state, that is, with the valving spool 52 positioned as shown in FIG. 2, but with the valving spool 50 leftward with the arm 78 in contact with the valving spool 52, a back pressure still exists on the pump 10, since such pump 10 has not yet been communicated to drain.

Subsequent to the blocking of communication between the inlet port 30 and working port 38 by the spool 52, the spool 50 is moved rightwardly under the resilience of the spring 58, after full rightward travel of the spool 52 to provide communication between the inlet port 32 and outlet port 34 so that the pump 10 is unloaded because the pump 10 now communicates with tank 12 through inlet port 32 and outlet port 34. That is, prior to the providing of communication between the inlet port 32 and outlet port 34, the valving spool 52 blocks communication between the inlet port 30 and working port 38. In such a state, it will be readily understood that, with the pump 10 being unloaded at a time when pump pressure need no longer be supplied to the steering yoke actuating piston, the engine of the vehicle is relatively less loaded, resulting in high economy and efficiency of operation of the vehicle.

We claim:

1. A control valve comprising: a valve having inlet portion means comprising first and second inlet ports for communication with first and second branch conduits communicating with a source of fluid pressure, an outlet port adapted to communicate with a tank, and a working port, each port communicating with a bore defined by the valve body; first and second valving spools reciprocally positioned within the bore, the first valving spool being movable to a first position to provide communication between the first inlet port and the outlet port, and movable to a second position to block fluid communication between the first inlet port and the outlet port; and second valving spool being movable to a first position blocking fluid communication between the second inlet port and the working port, and movable to a second position providing fluid communication between the second inlet port and the working port; and means operatively connected with the first and second valving spools for providing that movement of the first valving spool from its first to its second position moves the second valving spool from its first to its second position, and movement of the first valving spool from its second to its first position moves the second valving spool from its second to its first position, wherein the means operatively connected with the first and second valving spools comprise means for providing that the second valving spool provides communication between the second inlet port and working port subsequent to the blocking of fluid communication between the first inlet port and outlet port by the first valving spool, as the first and second valving spools are moved from the first to the second respective positions thereof, wherein the means operatively connected with the first and second valving spools comprise means for providing that the second valving spool blocks communication between the second inlet port and working port prior to the providing of communication between the first inlet port and outlet port by the first valving spool, as the first and second valving spools are moved from the second to the first respective positions thereof, wherein the means operatively connected with the first and second valving spools comprise a first helical spring disposed between the second valving spool and a portion of the valve body, and a second helical spring disposed between the first valving spool and the second valving spool, the first valving spool defining an arm extending therefrom toward the second valving spool, said means operatively connected with the first and second valving spools providing that upon initial movement of the first valving spool from its first toward its second position, the second valving spool remains in its first position relative to the valve body until said extending arm contacts the second valving spool, whereupon the first and second valving spools are moved further together against the resilience of the first helical spring.

2. The apparatus of claim 1 wherein the second valving spool in its first position provides communication between the working port and outlet port.

3. The apparatus of claim 1 wherein the second valving spool defines a plurality of longitudinal slots for providing modulating of fluid between the second inlet port and working port as the second valving spool is moved from its first toward its second position.

* * * * *